Dec. 13, 1955  E. L. FAUST  2,726,500
POTATO HARVESTER AND SEPARATOR
Filed Dec. 2, 1952  4 Sheets-Sheet 2

Inventor:
Ellwood L. Faust
Paul O. Pippel
Atty.

Dec. 13, 1955    E. L. FAUST    2,726,500
POTATO HARVESTER AND SEPARATOR
Filed Dec. 2, 1952    4 Sheets-Sheet 3

Inventor.
Ellwood L. Faust
Atty.

Dec. 13, 1955

E. L. FAUST 2,726,500

POTATO HARVESTER AND SEPARATOR

Filed Dec. 2, 1952

Inventor:
Ellwood L. Faust
Paul O. Pippel
Atty.

United States Patent Office 2,726,500
Patented Dec. 13, 1955

2,726,500

POTATO HARVESTER AND SEPARATOR

Ellwood L. Faust, Richmond, Ind., assignor to International Harvester Company, a corporation of New Jersey Application December 2, 1952, Serial No. 323,532

7 Claims. (Cl. 55—51)

This invention relates to a potato harvester and more specifically to a novel field-traversing machine adapted to dig the potatoes and separate them from the dirt and the like and wherein the parts are disposed in a compact balanced arrangement.

A general object of the invention is to devise a novel harvester for a potato crop wherein the aggregate is conveyed along an extended route longitudinally and transversely of the unit and wherein sorting and separating means are disposed along the route to segregate the potatoes from the aggregate.

A still further object of the invention is to devise and arrange the route of travel of the aggregate so as to permit the positioning of operator's stations at strategic locations in aid of the mechanical sorting and cleaning means, the final operator's station being so arranged as to facilitate transferring of the potatoes by the operator into the bagging or truck loading elevator with a minimum of effort.

A more specific object of the invention is to devise a novel mechanical potato separator comprising in combination with an endless apron conveyor, a plurality of flail type impellers disposed to sweep transversely across the conveyor apron over the aggregate passing therebeneath on the moving apron, the flails functioning to roll the potatoes in such a manner as to discharge the potatoes laterally off the conveyor while the dirt and stones continue moving out from under the beaters and discharge off the end of the conveyor.

The invention contemplates disposing of the conveyor table at an upward inclination from the horizontal of approximately 12 degrees toward its discharge extremity whereby to facilitate rolling of the potatoes as they are rolled by the flails, the potatoes tending to roll in view of their rounded contours as contrasted to the contours of the stones which are generally flat and also have a specific gravity of about two and one half times that of the potatoes.

A still further object is to devise the flails of flexible material such that they would yield and pass over such heavier masses as the stones.

The invention comprehends the provision of a plurality of flails arranged side by side across the width of the conveyor table and rotating transversely of the table to impel the potatoes thereacross from one side to the other.

The invention further comprehends the provision of a flail roll with heavier beaters at the one side of the table and succeeding rolls closer to the discharge edge of the table with lighter flails. This arrangement obtains a harder impact on the potatoes which must be removed from a greater mass of aggregate and a lesser impact on those which must move the least distance and also effects least disturbance of the dirt and stones where they could easily be swept off with the potatoes.

These and other objects of the invention will become more apparent from the specifications and the drawings wherein.

Figure 1:
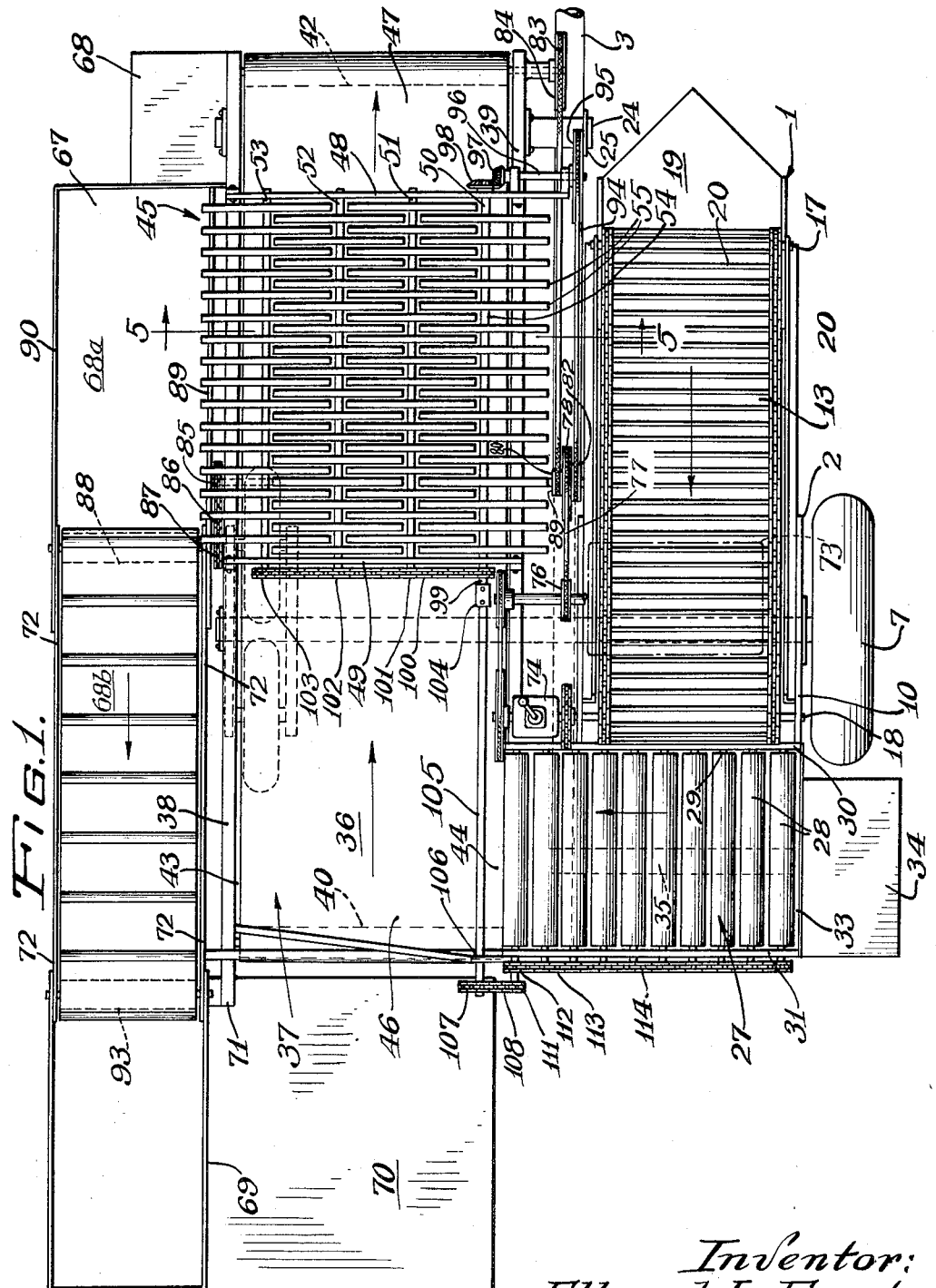
Figure 1 is a plan view of a novel potato harvester made in accordance with the invention.

In order to clarify the illustrations in cetrtain views, parts may be omitted where more clearly shown in others.

Describing the invention in detail, the potato harvester, generally designated 1 comprises a wheeled field traversing ambulant or mobile frame 2 including a center main beam member 3 in the form of a tube affording the usual pivotal hitch point 4 at its forward end to an associated tractive device. The beam 3 extends from the front to the rear of the unit and intermediate its ends extends over and is connected to a cross bolster member or rear axle beam 5 one end of which extends to the right extremity of the unit and is connected to a spindle 6 on which is journaled a supporting wheel 7 of relatively large diameter. The opposite end of the beam 5 preferably pivotally supports a tandem wheel assembly 8 comprising fore and aft relatively small ground engaging wheels and a yoke 9 which is pivotally connected intermediate its ends to the bolster member 5.

The right end of the beam 5, inboardly of the wheel 7 mounts a pair of upstanding laterally spaced plate stanchions 10 and 11, which, at their upper ends, are preferably weld-connected to an overlying platform 12.

The stanchions 10 and 11 receive a rear extremity of a digger shaker chain conveyor elevator 13, the conveyor extending downwardly and forwardly and comprising a beam member 14 at each side to each of which are attached upstanding guide shields 15 which confine a conveyor chain 16, the chain 16 being trained about front and rear rolls 17 and 18, the front roll 17 being journaled at the front end of the conveyor 13 to the beam members 14 contiguous to the rear extremity of a digger spade 19 disposed between the forward extensions of the side panels 15 and suitably connected thereto and positioned for penetration into the ground. The conveyor chain 16 is of transverse rod type and comprises a top run 20 which is adapted to move rearwardly and discharge over the rear roll 18 which is journaled to the rear extremity of the beams 14.

Figure 2:
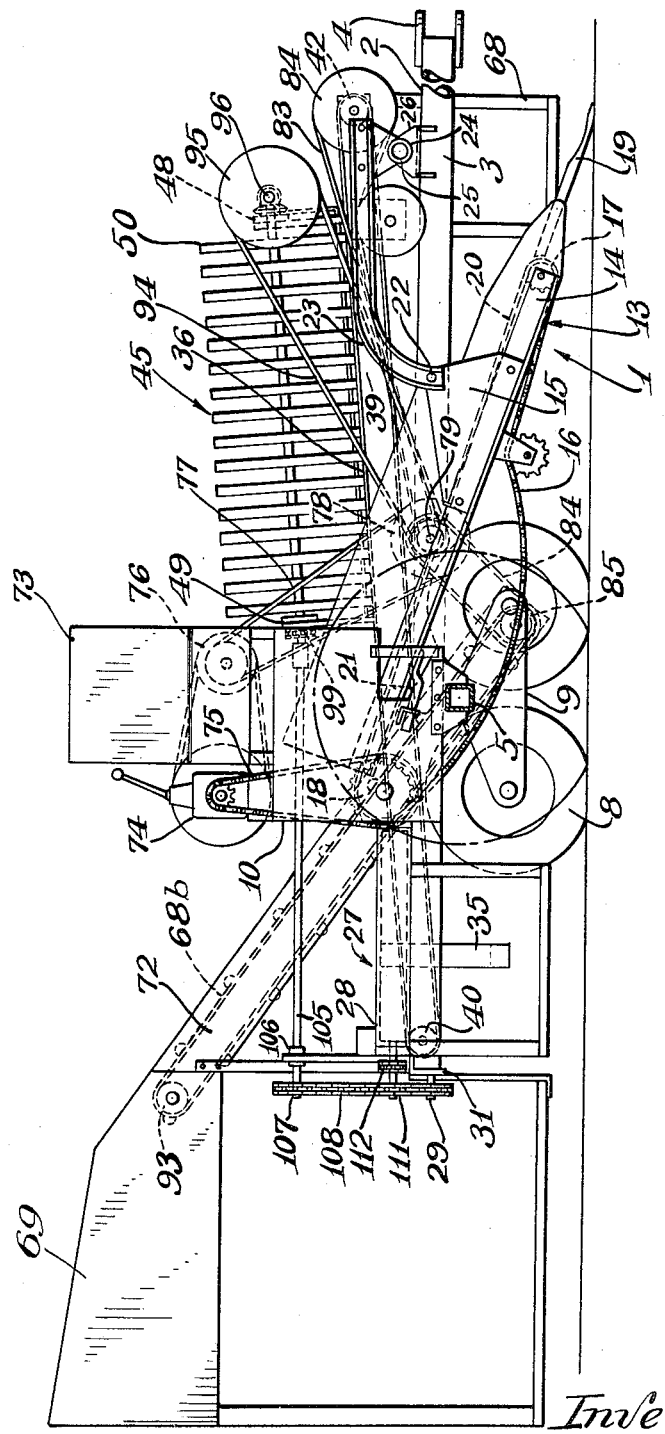
Figure 2 is a right side elevational view of the harvester.
Figure 3:
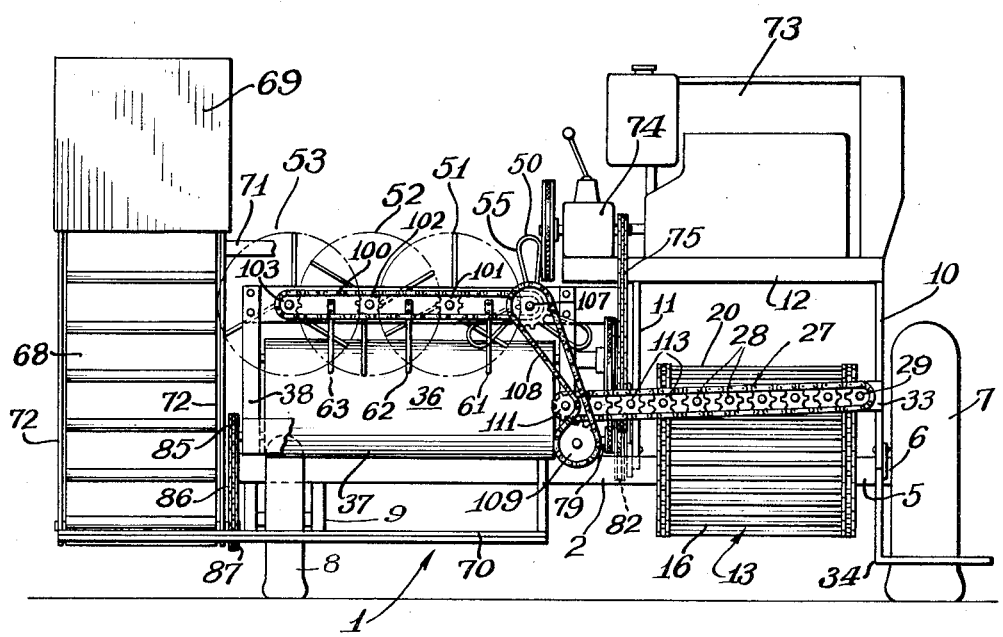
Figure 3 is a rear view of the harvester.

The rear end of the conveyor 13 is movably mounted through the medium of cooperative brackets 21 (Figure 2) loosely hinged to each other and located respectively on the sides of the conveyor 13 and the stanchions 10 and 11.

The forward end of the conveyor 13 is connected pivotally as at 22 from the side panels 15 to a lifting lever 23 rotatably mounted about a cross-shaft in the form of a tubular beam member 24 which is rigidly mounted by means of a bracket 25 weld-connected thereto and to the main beam member 3 and extending thereacross adjacent to the forward end thereof. The operating mechanism for the lever 23 is not shown inasmuch as the same is conventional and may be of any desired form, well known in the art, in order to raise and lower the digger 19 and the conveyor 13 for transport and operating purposes, respectively.

The rear or discharge end of the conveyor 13 discharges onto a cross-conveyor generally designated 27 and in the present instance comprising a plurality of spaced side by side generally parallel rollers 28, 28 each roller comprising a shaft 29 journaled through front and rear cross-beam members 30 and 31, the beam member 30 extending between the stanchions 10 and 11 and connected thereto at opposite ends thereof.

The outboard ends of the beams 30 and 31 are interconnected by a transverse beam 33 which carries an operator's platform 34, the beam 33 being suitably connected by bracing 35 to adjacent the rear extremity of the main beam 3.

The inboard extremities of the beam members 30 and 31 are also extended over the rear extremity of the beam member 3 and connected thereto.

The conveyor 27 slopes downwardly inboardly and the inboard or discharge extremity of the transverse conveyor 27 terminates approximately at the center of the lateral extremes of the machine and discharges the potatoes together with other aggregate such as stones, dirt and the like which have not been sifted out by the chain 16 or the conveyor 27 onto the top run or moving surface 36 of a draper conveyor apron or sorting table or platform member 37 which is inclined upwardly forwardly toward its discharge extremity at approximately 12 degrees from the horizontal.

The conveyor 37 comprises side beams 38 and 39 at opposite edges thereof, said beams 38 and 39 rotatably supporting carrier rolls 40 and 42 about which is trained the apron or belt generally designated 43. The conveyor 37 is supported through suitable brackets from the cross-beam 5 and the cross-beam 25.

It will be seen that the conveyor 37 is adapted to receive the aggregate discharging from the conveyor 27 along one edge thereof designated 44, the conveyor 27 overlapping edge 44, and this aggregate is adapted to be transported by the top run 36 of the conveyor 37 moving upwardly forwardly to beneath a separator generally designated 45 and positioned over the top run of the conveyor 37 intermediate the intake and discharge extremities 46 and 47 thereof.

The separator 45 comprises laterally spaced frame members 48 and 49 connected to the beam members 38 and 39 of the conveyor 37, the frames 48 and 49 journaling a plurality of flails or beater rolls or driven rotary members 50, 51, 52 and 53. The beater roll 50 comprises a center shaft 54 preferably set at an angle to surface 36 to eliminate dead spots, with a plurality of radially extending flexible loop type flails or beater paddles 55, 55 fastened at their radially inner extremities thereto as at 56. It will be seen that the flails 55 are arranged in sets of three equally spaced in the same plane and that there are a plurality of said sets spaced axially of the shaft 54 between the support frames 48 and 49. It will be further noted that the flail roll or impeller 50 is positioned to sweep over the side or edge 44 of the apron conveyor 37.

Figure 5:
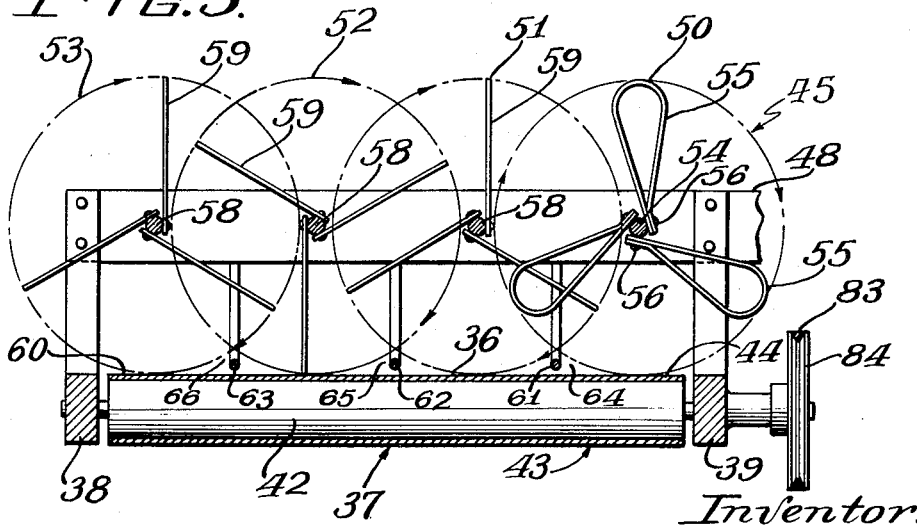
Figure 5 is an enlarged transverse vertical sectional view taken substantially on the line 5—5 of Figure 1.
Figure 4:
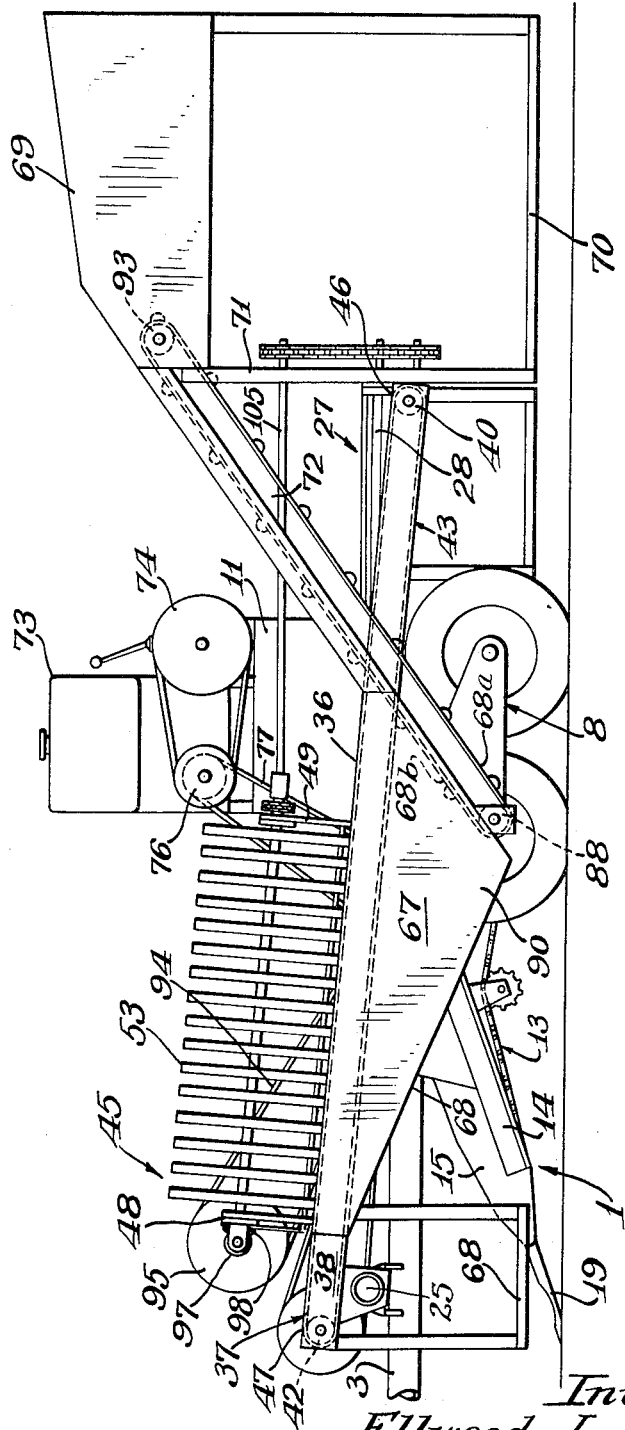
Figure 4 is a left side elevational view of the harvester.

The impellers or beater rolls 51, 52 and 53 are disposed in consecutive order toward the discharge edge of apron 36 and spaced from each other transversely of the conveyor table 37 and each of these impellers 51, 52 and 53 are preferably of substantially identical construction and each may comprise a center shaft 58 journaled in frames 48 and 49 with a series of beaters or paddles or flails 59, 59 extending radially outwardly from the associated center shaft 58 and secured at their inner ends thereto. It will be noted that flails 59 are preferably of less mass than the flails 55 and are of flexible construction more so than the flails 55 although all of the flails 59 and 55 are preferably made of rubberized materials of a type such as a tire carcass. It will be appreciated that the impellers rotate in the direction shown by the arrow in order to distribute the aggregate passing therebeneath, and because of the nature of the potatoes, to cause the same to roll laterally of the belt out of the aggregate and off the discharge side of the conveyor apron 37 as indicated at 60 (Figure 5). It will be noted that the frames 48 and 49 carry a series of hurdles 61, 62 and 63, the hurdle 61 having its cross member disposed transversely to the sweep of the impellers 55 above the top run 36 of the apron 37 and disposed in the bight 64 formed between the peripheral paths of the outer extremities of the impellers 55 and 59 of the assemblies 50 and 51. Similarly, the cross-rod of the hurdle 62 is disposed in the bight 65 formed by the peripheral paths of the outer ends of the fingers 59, 59 of the impeller assemblies 51 and 52. The hurdle 63 also has its cross member disposed in the bight 66 formed between the peripheral paths of the outer ends of the fingers 59, 59 of the impeller assemblies 52 and 53. These hurdles 61, 62 and 63 afford impedance means for stopping stones and dirt from being indiscriminately swept by the paddles 55 and 59 across the run 36 of the conveyor 37. However, they do not present such an obstruction to the potatoes which being round tend to roll over these hurdles and thus separate from the stones and dirt as assisted by the inclination of about 12 degrees of the apron 36. The flails of adjacent impellers are arranged in interleaving relationship.

The potatoes are adapted to be discharged into a hopper or collecting means 67 which is transversely aligned with the separator 45 and fastened to the beam member 38. The beam member 38 also supports a platform 68 at the discharge end 47 of the conveyor 37 for an operator to remove potatoes from the aggregate which have not been separated by the separator 45 and it will be noticed that the platform 68 is immediately adjacent to the hopper 67 so that the operator may readily and easily transfer the potatoes to the hopper. The hopper 67 has a downwardly rearwardly inclined bottom 68a which causes the potatoes to gravitate toward the rear extremity of the hopper, said rear extremity of the hopper being open to the top run of a slatted conveyor apron 68b and discharging thereon, the top run of the conveyor travelling upwardly rearwardly and discharging into a bagger hopper 69, the bagger hopper 69 being disposed above an operator's platform 70 which through suitable beam members 71 is connected with the beam members 72 of the elevator conveyor 68a and with adjacent portions of the framework 2.

The driving means for the various parts of the machine unit hereinbefore described comprises an engine 73 mounted on the platform 12 over the rear or discharge end of the shaker conveyor 13. The engine is belt-connected to a transmission 74 which is chain connected by drive transmitting means 75 to the driving roll 18 at the rear end of the shaker chain 16 of the conveyor 13. Thus, the speed of delivery by the conveyor 13 may be adequately controlled as the machine is being pulled through the field by a tractor connected to its drawbar to the before-mentioned hitch point 4 of the framework of the instant machine.

The engine output shaft further comprises a pulley 76 which drives a belt 77 which, in turn, drives a pulley 78.

The pulley 78 is keyed to a shaft 79 to which also are keyed pulleys 80 and 81 constrained for rotation with the shaft 79 and the pulley 78, the shaft 79 being supported at one end through a bracket 82 mounted on the beam member 3. The pulley 80 drives a belt 83 which is twisted to reverse the drive and trained about a pulley 84 keyed to the shaft of the roller 42 driving the apron of the conveyor 37. The shaft 79 extends under the conveyor 37 and at its other end is rotatably supported through a suitable bracket from the beam member 38 and keyed to a sprocket 85 driving a chain 86, the chain 86 being trained about a sprocket 87 and driving a roll 88 journaled at opposite ends from the hopper inboard and outboard panels 89, 90 and the side beam members 72 of the bagging elevator conveyor and driving the apron 68b which is trained about roll 88 at its lower end, the upper end of the apron being trained about a roll 93 which is suitably journaled to the beam members 72, 72 as well as the side panels of the bagging hopper 69.

The pulley 82 drives a belt 94 which drives a pulley 95, the pulley 95 being keyed to a shaft 96 supported through bearings from the frame 48, the shaft 96 having a bevel gear 97 which mates with a bevel gear 98 driving the shaft 54 which is journaled to frames 48 and 49, the shaft 54 of impeller 50 being keyed to a sprocket 99 which drives a chain 100 trained about sprockets 101, 102 and 103 on the shafts of the assemblies 51, 52 and 53, the arrangement driving all of the impellers in the same direction. The shaft 50 is connected through a universal joint 104 to a shaft 105 which, at its rear end, is journaled in a bearing 106 carried by the beam 31 and rearwardly thereof comprises a sprocket 107 driving a chain 108 trained about an idler 109 rotatably carried by a bracket connected to the adjacent portions of the frame 2. One run of the chain 108 is passed over a sprocket 111 which drives the shaft of the adjacent roller 28, the shaft being provided with a sprocket 112 and a shaft 29 of each roller 28 being also provided with a sprocket 113 and a common chain 114 is trained about the sprockets 112 and 113 and drives all of the rolls in the same direction to move the material in the direction indicated by the arrow in Figure 1.

It will be appreciated that the arrangement of the various components obtains compactness and localizes the drive in a safe position at the center of the machine. A balanced design is achieved with the wheels tracking between the rows.

What is claimed:

1. For use with a traveling harvesting machine for potatoes and the like including a digger and elevator unit extending in the direction of travel to dig the potatoes and convey them rearwardly and a transverse conveyor arranged at the rear of the elevator to direct the potatoes and accompanying debris laterally: mechanism for separating potatoes from earth clods, rocks and other debris comprising a moving platform in the form of a driven endless substantially smooth conveyor belt arranged parallel and attached to the digger and elevator unit and having one side positioned to receive potatoes and debris from said transverse conveyor at one end and convey them forwardly, said belt being inclined forwardly and upwardly at an angle sufficient to substantially diminish but insufficient to overcome the frictional forces holding the potatoes and debris to the surface of the belt, a plurality of driven rotary members arranged above and spaced from each other laterally of the belt and rotatable on axes substantially parallel in its direction of movement, said members having flexible elements projecting therefrom and extending a distance to the platform less than the dimension of an average size potato, said flexible elements being revolved at a speed sufficient to strike the potatoes and overcome the inertia and frictional resistance thereof and impart an initial impetus thereto to start them rolling laterally of the conveyor belt for discharge off the opposite side thereof free of said debris.

2. For use with a traveling harvesting machine for potatoes and the like including a digger and elevator unit extending in the direction of travel to dig the potatoes and convey them rearwardly and a transverse conveyor arranged at the rear of the elevator to direct the potatoes and accompanying debris laterally: mechanism for separating potatoes from earth clods, rocks and other debris comprising a moving platform in the form of a driven endless conveyor belt arranged parallel and attached to the digger and elevator unit and having one side positioned to receive potatoes and debris from said transverse conveyor at one end and convey them forwardly, said belt being inclined forwardly and upwardly at an angle sufficient to substantially diminish but insufficient to overcome the frictional forces holding the potatoes and debris to the surface of the belt, a plurality of laterally spaced rotary members arranged above the belt intermediate its ends on axes substantially parallel to its direction of movement and aligned transversely of said belt, said members having flexible flail-like elements projecting therefrom and extending a distance to said platform less than the cross-dimension of an average size potato, said flexible elements being revolved at a speed sufficient to strike the potatoes and overcome the inertia and frictional resistance of the potatoes and start them rolling in a direction laterally of the belt, one of said members disposed along said one side of said belt, and said elements on said members from said one side of the belt toward the other being disposed in successive transferring relationship to each other.

3. A sorting device for harvested potatoes and the like adapted to receive thereon rocks and clods of earth and other debris along with the potatoes to be separated therefrom, comprising a platform having a movable surface adapted to receive near one end and at one side material deposited thereon and to advance the material toward the other end of the platform, a plurality of laterally spaced impeller assemblies comprising driven shafts mounted above the platform generally parallel thereto and disposed side by side in alignment transversely of the platform, and axially spaced radially projecting flexible flail-like members mounted on said shafts and each having an outer extremity movable in a circular path which is spaced a distance from the platform less than the cross-dimension of an average size potato and adapted to strike and impart sufficient impetus to the potatoes to roll them transversely across the moving platform.

4. The invention set forth in claim 3 further characterized by the fact that the flail-like members of adjacent assemblies are arranged in interleaving relationship with each other crosswise of the platform to assure that successive blows will be imparted to the potatoes to move them laterally.

5. The combination set forth in claim 3 further characterized in that one of said shafts being disposed in substantially vertical alignment with said one side of the surface and the flail-like members thereon being less flexible than said members on the other shafts.

6. The sorting device according to claim 3 wherein said flail-like members are of flexible non-metallic material, and one of the said shafts being disposed adjacent said one side of the surface and said flail-like members thereon being in the form of closed loops and of greater mass than the flail-like members on the other of said shafts.

7. The invention according to claim 4 and a series of hurdles supported above the platform and spaced transversely thereof and each comprising a rod extending generally parallel to said direction of movement of said movable surface and spaced from the platform a distance less than said cross-dimension of the average size potato and disposed between the paths of movement of said assemblies.

References Cited in the file of this patent

UNITED STATES PATENTS

| | | |
|---|---|---|
| 2,015,549 | Dwyer et al. | Sept. 24, 1935 |
| 2,277,450 | Parr | Mar. 24, 1942 |
| 2,464,305 | Greaves | Mar. 15, 1949 |
| 2,532,314 | Johnson | Dec. 5, 1950 |